Patented Mar. 23, 1943

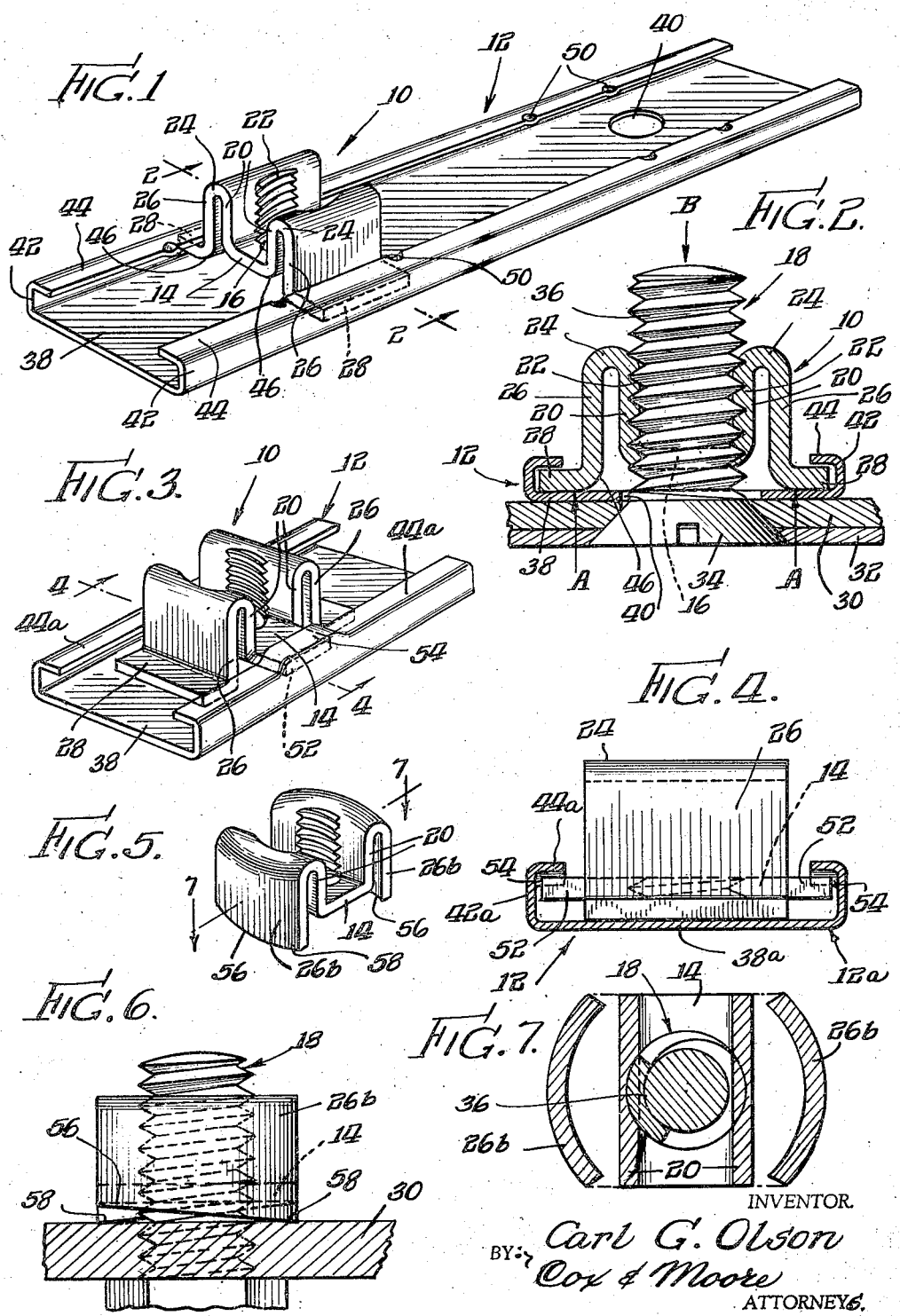

2,314,509

UNITED STATES PATENT OFFICE 2,314,509

LOCK NUT

Carl G. Olson, Chicago, Ill., assignor to Illinois Tool Works, Chicago, Ill., a corporation of Illinois Application July 20, 1939, Serial No. 285,501

6 Claims. (Cl. 151—21)

The present invention relates in general to locking and holding devices and, more particularly, to locking devices of the internally threaded type adapted to be applied to a threaded shank of a fastener in the manner of the conventional nut.

The present invention contemplates yet more particularly the provision of a locking device and nut as above which may be formed by simple manufacturing steps from sheet material, namely, by simple punching and tapping operations, to provide an article adapted to grip the threaded shank of a screw as axial tightening progresses for resisting loosening of the nut after final assembly. Assembled fasteners of the instant class are often subjected to vibration and shock subsequent to assembly which not infrequently results in loosening or disengagement of the parts.

It is an object of the present invention to provide a simple and economically constructed lock nut as above provided with opposite individual walls supporting thread sections or other thread follower means for engagement with a threaded shank or the like which thread sections are so supported that axial stressing, as by tightening the cooperating fastener, results in an inward flexing force oppositely applied to the thread shank with a radial grasping pressure.

A yet more specific object of the present invention is to provide opposed gripping walls as above wherein flexing of the opposed wall sections results from the disposition of the said walls in normally spaced relation to a work engaging base or contact surface, which contact surface is laterally or outwardly positioned with respect to the axis of the nut so that the walls are caused to cam, cant or strut in gripping relationship as the wall surfaces are distorted relatively and axially toward the work surface. In other words, the present invention particularly contemplates the provision of wall surfaces extending axially and oppositely of the screw shank for receiving segmental portions of the screw threads, which walls are, however, adapted to be relatively tensioned or strained toward the work contacting surfaces of the nut, and, as a result of this strain, to approach one another in clamping relationship.

Yet more particularly the present invention contemplates the attainment of the foregoing objects by means of a shank receiving member comprising an apertured threaded wall provided with upstanding opposite walls having segmental thread recesses as above, the shank receiving unit cooperating with outer supporting walls spaced from and extending adjacent the inner walls and normally spacing the said apertured or bottom wall from the work piece. In accordance with this construction the bottom or apertured wall when clampingly strained toward the work piece tends to draw the inner wall sections radially inwardly.

It is a yet further object of the present invention to provide a locking nut as above having a screw shank receiving aperture and associated clamping walls wherein the clamping walls are extended and formed over to provide reversely extending supporting members radially outwardly disposed and adapted to extend beyond the apertured bottom wall for engagement adjacent a work piece to receive the clamping forces transmitted by the nut.

A yet more specific object of the present invention contemplates the provision in a locking device as above of a supporting or work engaging portion adapted to cut its way or embed itself into the work piece for positioning the supporting extremity laterally or radially with respect to the work piece so as to transmit to the work piece the laterally reactive stresses resulting from the radially clamping forces applied against the fastener shank.

The foregoing and numerous other objects and advantages of the present invention will be more apparent after a perusal of the following specification when taken in connection with the accompanying drawing wherein:

Figure 1 is a perspective view of a nut or the locking device constructed in accordance with the present invention for receiving the shank of a fastener, the nut being disclosed in combination with a supporting base or channel.

Figure 2 is a sectional view taken on a line 2—2 of Fig. 1.

Figure 3 is a perspective view similar to Fig. 1 showing a modified form of construction embodying the principles of the present invention.

Figure 4 is a sectional view taken laterally across the assembly of Fig. 3 on the section line 4—4 thereof.

Figure 5 is a perspective view of a yet further modified preferred form of locking nut.

Figure 6 is an end elevational view of the device shown in Fig. 5, the element being displayed in Fig. 6 in operative relationship with a threaded shank of a fastener and an associated work piece in order to illustrate the locking co-action with the work.

Figure 7 is a sectional view taken horizontally through the structure of Fig. 5 on structure line 7—7 thereof.

Referring to the drawing where several illustrative forms of the invention are disclosed more in detail, it will be seen from Figs. 1 and 2 that the present invention contemplates a resilient locking device or nut indicated by the reference numeral 10 and arranged upon a retaining brace or channel 12.

The nut comprises an apertured lateral wall 14, the aperture being designated by the numeral 16 the inner periphery of the aperture being provided with a continuous thread for receiving the threaded shank of a complementary fastener such as a machine screw 18 shown in Fig. 2. The wall portion 14, together with a pair of opposed walls 20 forms the fastener shank engaging portion of the nut construction, since it will be obvious from the figures that the wall sections 20 are provided with opposed segmental thread receiving recesses 22 so arranged as to form a continuation of the thread or thread follower means on the inside of the aperture 16. To this end it should be noted that the walls 20 extend axially from points adjacent the periphery of the aperture 16 and are oppositely positioned with respect to the aperture, the walls being thus independent and adapted to flex laterally with respect to the plane of the lower wall 14.

The shank embracing walls 20 terminate in bends or loops 24 projecting downwardly in supporting walls 26. In other words, the walls 26 extend oppositely or reversely of the fastener engaging walls 20 and outwardly thereof and perform the important function of arranging or disposing the shank engaging portions of the fastener in spaced relation to the work. Thus it will be seen that the supporting legs or walls 26 project downwardly beyond the apertured wall 14 and, in the present embodiment, terminate in outwardly projecting foot or base portions 28 formed by merely flanging the extremities of the stock. From the foregoing it will be evident that the flanges 28 locate the unit with respect to the work surfaces so that it may be drawn clampingly toward the surface by the axial pulling stress of the fastener.

It is of extreme importance to note that the opposed work shank embracing portions 20 are independently laterally adapted to flex under the influence of the axial tightening stress of a fastener. To illustrate this construction, I have illustrated in Fig. 2 the combination of locking nut 10 and the fastener 18 clampingly and lockingly joining work pieces 30 and 32. The fastener is of the headed type having a frusto conical or flat slotted head portion 34 and an axially extending threaded shank or stem 36 which, as clearly shown in the figure, is received within the complementary thread follower recesses and apertures 22 and 16, respectively. The clamping stresses applied to the nut are necessarily resolved or localized at the foot or flange portions 28 by virtue of the fact that these are the only portions in force transmitting relationship to the work piece. The clamping forces thus applied against the nut surfaces are, for purposes of illustration, represented by the letter A. These forces are resisted insofar as the nut structure is concerned by equal and opposite forces created by the tensioning of the fastener 18 along its axis as indicated by the letter B. It will be evident that these latter forces are transmitted to the fastener to balance the forces A, particularly along the threaded recesses 22 wherein the parts are axially interengaged in accordance with the present construction. Therefore, the forces A and B being equal and opposite and being necessarily laterally offset with respect to their direction of application induce a twisting or turning moment acting about the relatively fixed point of application of the forces A. The stresses are rendered clampingly effective by virtue of the axial flexure or strain of the parts. That is to say, as a result of the application of the foregoing stresses, the central portions of the nut flex axially toward the point of application of the forces A and as the necessary result of such a turning moment, the walls 20 are caused to flex radially inwardly to oppositely approach the shank 36. In other words, the right hand wall 20 is subjected to a strain acting in a counterclockwise direction, while the opposed gripping wall is subjected to an opposite torque or strain. The opposite clamping forces thus applied to the shank frictionally lock the fastener to the nut, the gripping forces applied depending upon the axial clamping stress exerted by the fastener. This very important and practical result positively assures the locking interengagement of the fastening members which have been adequately tightened with respect to the work piece whereby the parts are permanently joined against relatively retrograde movement. It may accordingly be stated that the present fastener provides opposite resilient gripping walls which, under the influence of clamping forces, are caused to cant or incline inwardly in camming or strutting relationship to exert a locking force against the outer surfaces of the fastener shank.

It is of further importance to note that the lateral gripping forces must be, at least in part, resisted at the foot or base portions of the nut 28 to which end the channel or guide member 12 is provided. It will be noted that the channel 12 has a lower wall 38 apertured centrally at 40 to receive the screw shank. Opposite lateral side edges of the channel member are formed upwardly as at 42 providing retaining walls which terminate in inwardly extending enclosing walls 44. Fig. 2 clearly discloses the manner in which this lateral flange construction embraces the extremities of the foot or base portion 28 to positively resist outward movement of the portions 28 with respect to the work surfaces.

In this connection attention is further particularly directed to the fact that the flanges of the foot portions 28 are preferably directed laterally outwardly providing curved surfaces 46 at the juncture with the upwardly extending wall 26 in order to promote lateral flexing of the unit. In other words, in accordance with the present construction, there is little resistance to inward flexure of the unit about the points A. On the other hand, it will be evident that extension of the foot portions 28 laterally inwardly from the upstanding walls 26 might in many cases interfere materially with this flexure by creating additional resistance at this point.

The present channel construction 12 moreover provides a convenient retaining means for the nuts, facilitating materially the application of the fasteners and the initial assembly operations. In accordance with the construction shown in Fig. 1, the channel 12 is provided opposite each of the receiving apertures 40 with retaining detents 50 formed by offsetting or depressing the edge of the flange 44 laterally toward the bottom wall 38. The detent portions serve to longitudinally restrain the nut 10 in the channel and adjacent the cooperating aperture 40, the detents projecting downwardly just sufficiently to resist passage of the flanges 28, except by flexure under an increased force. It will be obvious that this construction confines each nut to a predetermined location facilitating application of the screw to the work although the spacing of the indentations is preferably such as to provide for limited longitudinal adjustment to simplify axial alinement of the complementary members.

I have disclosed in Figs. 3 and 4 a slightly modified nut which differs structurally from the foregoing embodiment in that the bottom or apertured wall 14 of the nut is extended laterally beyond the axial side edges of the supporting walls 20 and 26 to provide tabs or extensions 52 for engagement with a supporting channel 12. It will be noted that the flange portions 42a and 44a project above the bottom wall 38a, the extensions or projections 52 received thereby being disposed at a relatively greater elevation from the base or bottom portions of the nut by virtue of the relatively elevated arrangement of the wall 14. In the present embodiment the supporting foot or flange portions 28 of the nut project longitudinally of the channel. That is to say, the present nut occupies a position relatively to the channel which is at right angles to the position normally occupied by the foregoing embodiment and the positioning of the supporting flanges 28 in the plane of the channel is maintained by virtue of their frictional contact with the channel, as may be suitable in many instances.

It should be noted that the present construction provides for the longitudinal positioning of the nuts with respect to the channel through the agency of upwardly deformed portions 54 of the flange 44a which provide a downwardly facing recess or enclosure for the extensions 52.

I have disclosed in Figs. 5 to 7 a yet further modification which obviates completely the necessity of a supporting channel construction, and thus provides a very simple and efficient lock nut at a low cost of production. This preferred embodiment is identical with the previous embodiment in respect to the fastener gripping portions, including the walls 14 and 20 and the apertured recess configurations. The present construction, however, omits the flanged foot construction and preferably provides arcuately disposed outer walls 26b in order to secure an important improved result, as will hereinafter appear more in detail. As clearly evident from a consideration of Fig. 7, the walls 26b are disposed in a plane forming a cylinder, the central axis of which is co-axial with a complementary fastener shank and accordingly with the central axis of the helix of the thread sections 22. The arc of the wall surface may coincide with the foregoing plane throughout its axial extent or may decrease slightly in curvature toward the upper edge of the wall in accordance with the preferred manufacturing procedure. In any event it is deemed important that the lower extremities of the wall 26b reside in the said arcuate curve so that the said extremities provide abutment surfaces disposed annularly about and concentric with the central axis of the fastener.

Reference is now made specifically to Fig. 6 wherein is shown in detail the disposition of the abutment or supporting surfaces forming the ultimate extremities of the wall 26b. The surfaces indicated by the reference numeral 56 provide work cutting or biting edges 58 which are in engaging relationship with the outer surfaces of the work piece. It will be apparent from the foregoing that when the present nut is operatively disposed upon the shank of a screw 18 and tightened in cooperative relationship to the work 30 that the biting edges 58 tend to dig or embed themselves into the surface of the work material and upon relative rotation of the nut under the influence of the screw, form an annular groove or recess complementary to the lower extremities of the supporting wall 26b for accommodating said extremities to positively resist lateral spreading of the supports. In application to the work, therefore, the present embodiment provides for the positive engagement of the fastener against lateral collapse wherefore application of the above described effect is rendered operative in its fullest degree.

The present invention is of particular significance in that it provides a lock construction which may be formed from sheet metal or from strip stock such, for example, as spring stock, by a simple and inexpensive forming operation. More particularly it will be evident that the embodiments disclosed in the foregoing specification and drawing lend themselves to manufacture by simple stamping and tapping operations and enable the production of an efficient lock nut at a very low cost. In accordance with the preferred embodiments of the present invention, the lock nut makes locking engagement with both the work and the fastener shank in order to lock all three of the parts against unauthorized loosening. In accordance with all of the several embodiments the fastener contacting portions are drawn or flexed axially by the clamping force of the screw to cause the contacting portions to frictionally grip the screw shank, the relative axial shifting occurring by virtue of the normal spacing of the fastener gripping portions of the nut with respect to the work piece. It is thought that the present construction, therefore, affords numerous advantages both in manufacture and use which effects a considerable saving to the user.

It is to be noted that, in accordance with the present invention, the opposite shank gripping or clamping portions comprise wall sections which are independently arranged. In this respect the present invention must be carefully distinguished over constructions wherein opposed portions are integrally arranged or otherwise so supported as to be incapable of substantial lateral flexing or shifting essential to the operation of the present invention. It should be further noted that these clamping or locking sections, while functioning primarily to maintain the interengagement of the screw and nut, add materially to the holding power of the locking unit.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. A locking device formed from spring stock including a central section presenting substantially parallel side walls joined at one extremity by and extending laterally with respect to a connecting web, said web being provided with a central aperture for accommodating a screw member, thread follower means in said walls co-axially disposed with respect to said aperture, a continuation of the stock of each of said walls at the end oppositely disposed from said web bent back upon itself so as to provide a support member externally of and adjacent each of said walls, said support members extending in substantial parallelism with said walls and terminating at a point axially beyond said web, and flange means formed integral with and extending normally of each of said support members.

2. A locking device formed from spring stock including a central section presenting substantially parallel side walls joined at one extremity by and extending laterally with respect to a connecting web, said web being provided with a central aperture for accommodating a screw member, thread follower means in said walls coaxially disposed with respect to said aperture, and a continuation of the stock of each of said walls at the end oppositely disposed from said web bent back upon itself so as to provide a support member externally of and adjacent each of said walls, said support members extending in substantial parallelism with said walls and terminating at a point axially beyond said web, the free extremities of said support members providing clamping edges for engaging a work surface when a screw element and said locking device are relatively rotated.

3. A locking device formed from spring stock including a central section presenting substantially parallel side walls joined at one extremity by and extending laterally with respect to a connecting web, said web being provided with a central aperture for accommodating a screw member, thread follower means in said walls coaxially disposed with respect to said aperture, and a continuation of the stock of each of said walls at the end oppositely disposed from said web bent back upon itself so as to provide a support member externally of and adjacent each of said walls, said support members extending in substantial parallelism with said walls and terminating at a point axially beyond said web, the free extremities of said support members providing clamping edges for engaging a work surface when a screw element and said locking device are relatively rotated, said support members being circumferentially arcuate in shape.

4. A locking device formed from spring stock including a central section presenting substantially parallel side walls joined at one extremity by and extending laterally with respect to a connecting web, said web being provided with a central aperture for accommodating a screw member, thread follower means in said walls coaxially disposed with respect to said aperture, and a continuation of the stock of each of said walls at the end oppositely disposed from said web bent back upon itself so as to provide a support member externally of and adjacent each of said walls, said support members extending in substantial parallelism with said walls and terminating at a point axially beyond said web, the free extremities of said support members providing clamping edges for engaging a work surface when a screw element and said locking device are relatively rotated, said support members in transverse cross-section being concentrically disposed with respect to the aperture in said web.

5. A locking device formed from spring stock including a central section presenting substantially parallel side walls joined at one extremity by and extending laterally with respect to a connecting web, said web being provided with a central aperture for accommodating a screw member, thread follower means in said walls coaxially disposed with respect to said aperture, a continuation of the stock of each of said walls at the end oppositely disposed from said web bent back upon itself so as to provide a support member externally of and adjacent each of said walls, said support members extending in substantial parallelism with said walls and terminating at a point axially beyond said web, and flange means formed integral with and forming an extension of said web at opposite sides thereof, said flange means extending beyond the adjacent side portions of said walls and support members.

6. A locking device formed from spring stock including a central section presenting substantially parallel side walls joined at one extremity by and extending laterally with respect to a connecting web, said web being provided with a central aperture for accommodating a screw member, thread follower means in said walls coaxially disposed with respect to said aperture, and a continuation of the stock of each of said walls at the end oppositely disposed from said web bent back upon itself so as to provide a support member externally of and adjacent each of said walls, said support members extending in substantial parallelism with said walls and terminating at a point axially beyond said web, one portion of the free extremity of each support member extending axially beyond said web a greater distance than the remaining portion thereof.

CARL G. OLSON.